United States Patent [19]
Ciuffetelli

[11] Patent Number: 5,463,858
[45] Date of Patent: Nov. 7, 1995

[54] MUSHROOM HARVESTER AND METHOD

[76] Inventor: Andrew J. Ciuffetelli, 314 S. Guernsey Rd., West Grove, Pa. 19390

[21] Appl. No.: 151,265

[22] Filed: Nov. 12, 1993

[51] Int. Cl.$^6$ .................................................. A01D 46/00
[52] U.S. Cl. ........................ 56/327.1; 56/121.46; 47/1.1; 99/637
[58] Field of Search ............................. 56/327.1, 121.46; 47/1.1; 99/635, 636, 637

[56] References Cited

U.S. PATENT DOCUMENTS

| | | |
|---|---|---|
| 1,379,724 | 3/1921 | Russell . |
| 2,858,865 | 11/1958 | Fleming et al. . |
| 3,179,138 | 4/1965 | Norris . |
| 3,319,680 | 5/1967 | Coleman et al. . |
| 3,734,004 | 5/1973 | Losito ........................................ 99/637 |
| 3,970,150 | 7/1976 | Gibson, Jr. et al. ................ 56/327.1 X |
| 4,545,186 | 10/1985 | MacCanna ........................ 56/327.1 X |
| 5,040,328 | 8/1991 | Coon ....................................... 47/1.109 |

*Primary Examiner*—Terry Lee Melius
*Attorney, Agent, or Firm*—Robert C. Podwil; Reed, Smith, Shaw & McClay

[57] ABSTRACT

A method harvesting mushrooms comprises steps of engaging picked mushrooms with supporting pins, to place the mushrooms in a desired orientation for separation of caps from stumps, and cutting the caps from the stumps by relative movement of the supported mushrooms and a cutter spaced from the ends of the supporting pins. Size grading of the cut mushrooms is relatively easily accomplished by arranging the picked mushrooms in the apparatus according to size. One apparatus for practicing the method has a frame, a vertically movable bed associated with the frame, and spaced mushroom supporting pins extending upwardly from a bottom wall of the frame through clearance openings in the bed. The pins and bed support mushrooms in an upright position, enabling a horizontally moveable cutter associated with the frame and operable in a plane above the ends of the pins to separate mushroom caps from stumps. The stumps may readily be removed from the harvester by raising the bed, which pushes the cut stumps from the pins, and manually manipulating the frame to dump the cut stumps. Another form of apparatus uses a moving belt to convey mushrooms past a cutter to separate caps from stumps.

13 Claims, 4 Drawing Sheets

MUSHROOM HARVESTER AND METHOD

BACKGROUND OF THE INVENTION

This invention relates to a mushroom harvester and method, and more particularly, to an apparatus and a method which facilitate the harvesting of fresh mushrooms and the speedy separation of product from waste stumps.

In the traditional method of harvesting mushrooms, a picker typically leans into the growing bed and pulls from the bed three to five mushrooms at a time. He or she then leans back toward pre-positioned product and stump containers, and individually cuts each stump, using a hand-held knife. The mushroom caps (products) are then placed in a proper container for storage or shipment.

Mushrooms of medium size typically weigh about 25 pieces per pound, so that there would typically be about 250 mushrooms per 10 pound container. To harvest 250 mushrooms using conventional manual techniques, would thus require of the picker approximately 50–85 in and out motions from the growing bed and 250 individual cutting motions to remove the 250 stumps. Depending upon the quality, size and coverage on the growing bed, manual harvesting in the above manner can be expected to yield approximately 40–60 pounds of product per hour.

The present invention relates to apparatus and a method which greatly enhance the output of a mushroom picker by enabling the picker to pick mushrooms from the growing bed with both hands, to cut product from stumps in a single cutting operation, and to facilitate dumping of the stumps into a collecting container in a single operation.

By eliminating substantially all individual hand movement in the removal of stumps from the product, and effecting such removal in one quick action, the mushroom harvesting process is made much more efficient and cost effective. Harvesting using the present apparatus and method is believed to be 100% to 150% more productive for each man-hour.

BRIEF DESCRIPTION OF THE INVENTION

In its apparatus aspect, the present invention provides in one presently preferred form an open-top frame defining a holding area for picked mushrooms. Spaced product supporting pins extend upwardly from a bottom wall of the frame through a floating vertically adjustable bed. Picked mushrooms may be placed on and between the pins, so that the pins and the bed support picked mushrooms in a "cap-up" position. So orienting the picked mushrooms provides an incidental benefit of impromptu size and quality grading. A horizontally movable cutter associated with the frame and disposed above the ends of the product supporting pins serves to separate the product from the stumps. The stumps may readily be removed from the harvester by forcibly raising the bed, and provision is made for readily doing so. In this regard, the bed is controlled by handles mounted on the frame, so constructed that when they are appropriately manipulated, the bed is caused to rise above the ends of the pins, thus ejecting the stumps from the pins and allowing for easy dumping of the stumps from the frame into a suitable container. The handles associated with the frame thus provide both a means for manipulating the frame and for actuating movement of the bed.

In an alternative form of the apparatus, the pins are mounted on an endless belt, which moves the mushrooms past a cutting edge to separate caps from stumps. The caps and severed stumps are kept apart, and collected at different locales.

In its method aspect, the present invention involves the steps of providing a product holding area and product holding pins in the area, placing mushrooms with stumps attached onto the product holding pins to fill the holding area, cutting product from the stumps by relative movement between the mushrooms and a cutter, and removing the product from the holding area.

For the purpose of illustrating the invention, there are shown in the drawings forms of the invention which are presently preferred. It should be understood, however, that the invention is not limited to the precise arrangements an instrumentalities shown.

BRIEF DESCRIPTION OF THE DRAWINGS

Referring now to the drawings in detail, wherein like reference numerals signify like elements, there is seen in FIG. 1 a mushroom harvester apparatus designated generally by the reference numeral 10.

Figure 1:
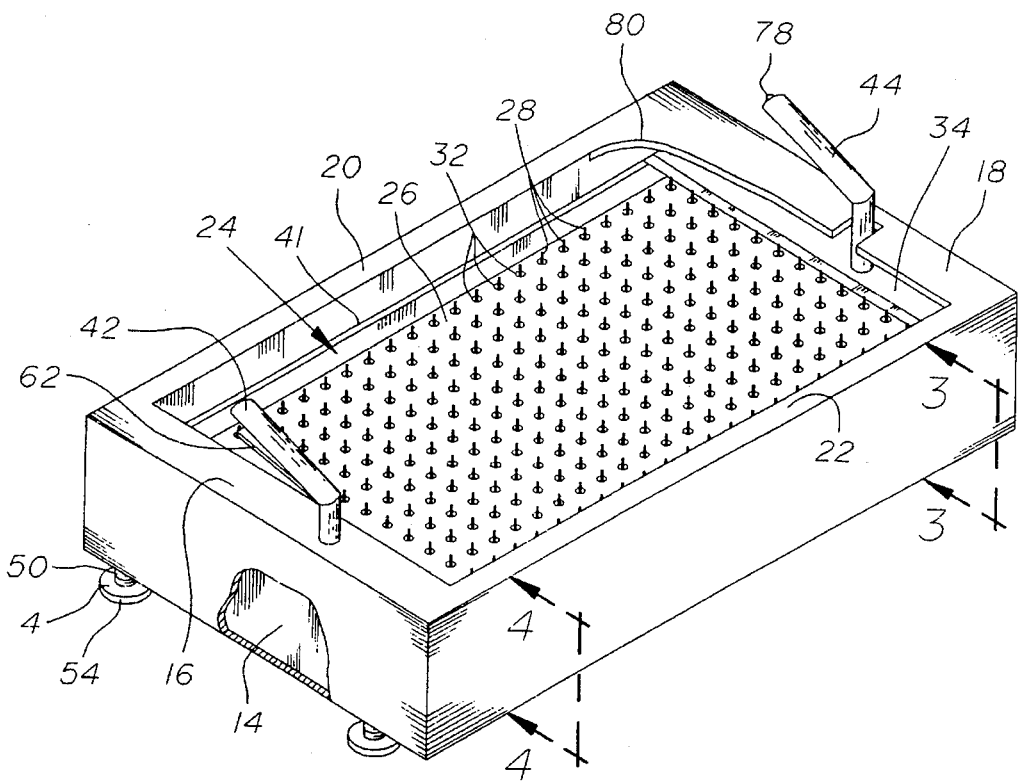
FIG. 1 is a perspective view, partly broken away, of a form of mushroom harvesting apparatus in accordance with the invention.

The mushroom harvester 10 includes a frame, designated generally by the reference numeral 12, having a bottom wall 14 and pairs of oppositely disposed and wall forming rails 16, 18, 20 and 22. The frame 12 has a top opening 24.

Within the frame and suspended above the bottom wall 14, in a manner described below, is a vertically movable, or "floating" bed 26.

Extending generally vertically upwardly from the bottom wall 14 are spaced product holdings pins 28. The pins 28 are preferably distributed, as is perhaps best seen in FIGS. 1 and 2, in a uniform grid-like arrangement, the individual pins 28 being spaced in such a manner that picked mushrooms may be placed on them, with stems down and caps above the distal upper ends 30 of the pins 28. The individual pins 28 extend through respective clearance openings 32 in the bed 26, the clearance openings being so sized as to permit free vertical movement of the bed 26 relative to the pins 28.

Figure 2:
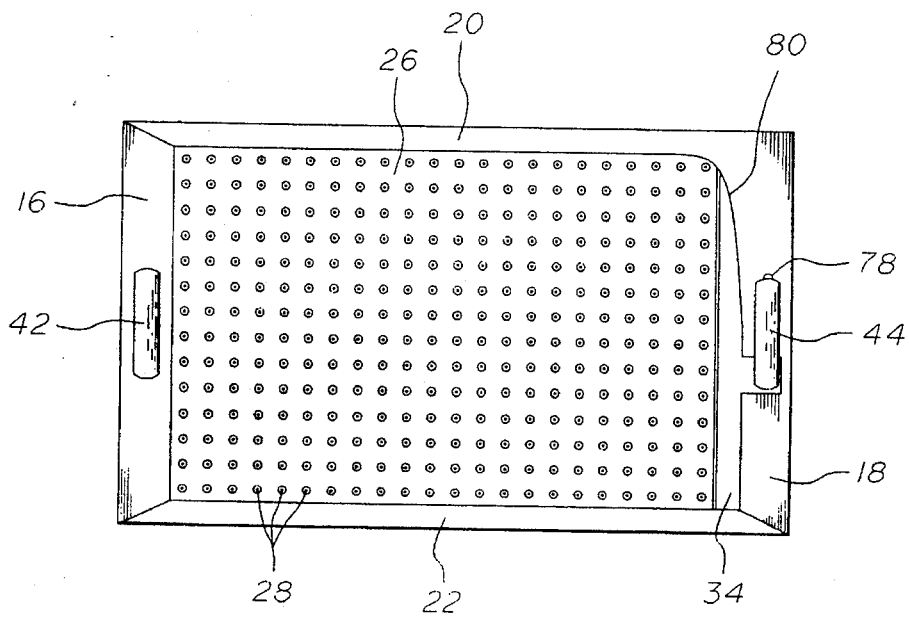
FIG. 2 is a top plan view, partly broken away, of the mushroom harvester apparatus in FIG. 1.

Referring now to FIGS. 1 and 2, associated with the frame 12 in the illustrated embodiment is a cutter 34. The cutter 34 is mounted on the frame 12 for movement relative to the frame 12 in a horizontal plane, that is, in a plane generally parallel to the plane of the floating bed 26 and also the plane of the ends 30 of the pins 28. The cutter 34 is so disposed relative to the ends 30 of the pins 28 that it does not interfere with them.

Figure 3:
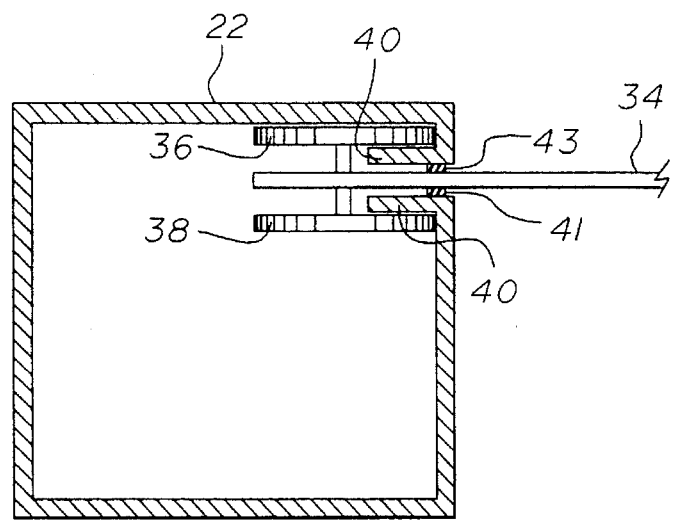
FIG. 3 is a cross-sectional view, taken along the line 3—3 in FIG. 1.

Referring now to FIG. 3, it will be seen that the cutter 34 is provided at its ends with suitable rollers 36, 38 which engage the respective rails 20 and 22 (the latter shown in FIG. 3) of the frame, and facilitate movement of the cutter 34 in the direction of those rails. FIG. 3 illustrates an exemplary roller arrangement, in which the rollers 36 and 38 at the ends of the cutter 34 cooperate with flanges 40 associated with the rail 22 of the frame 12. The cutter 34 extends through a slot 41 between the flanges 40. Suitable seals 43, typically of gasket-like resilient polymeric material, may be provided in the slot 41, to normally seal the slot 41 ahead of and behind the cutter 34 as the cutter 34 traverses the slot 41. Other equivalent arrangements may be employed. A suitable handle or other actuator is associated with the cutter 34.

Handles 42 and 44 (FIGS. 1 and 2), coupled in the illustrated embodiment to the rails 16 and 18 of the frame 12 (and in the case of the handle 44 also to the cutter 34), facilitate lifting and manipulation of the frame 12 and harvester 10, as will be explained below.

Figure 4:
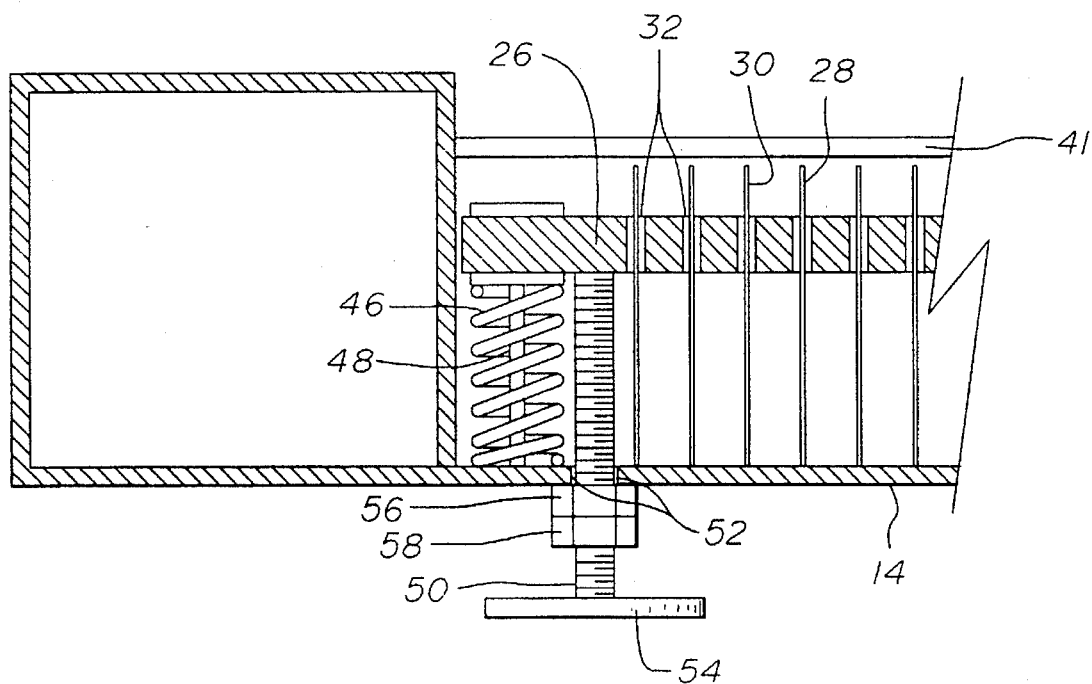
FIG. 4 is a partial cross-sectional view, taken along the line 4—4 in FIG. 1, illustrating, among others, details of the product holding pins and floating bed in accordance with the invention.

Referring now to FIGS. 1 and 4, the manner in which the bed 26 is mounted for what may be called "floating" action relative to the frame 12 and pins 28 is seen. Referring to FIG. 4, disposed adjacent to each corner of the bed 26 is a spring 46, preferably secured at its lower end to the bottom wall 14 of the frame and at its upper end to the bed 26. The bed 26 is thus supported by and may be said to "float" on the springs. A stabilizer rod 48 is associated with each spring 46, to constrain the bed 26 to a desired vertical alignment.

Also seen in FIG. 4 is an arrangement whereby the height of the bed 26 may be adjusted vertically to accommodate products having differing lengths of stem. In this regard, a threaded leg member 50 extends through an aperture 52 (which is typical of the others) disposed near one corner of the bottom wall 14. A base pad, or "foot" 54, is secured to or formed integrally with the leg member 50. The leg member 50 threadedly engages a nut 56 secured to the bottom wall. A second nut 58, threaded on the leg member 50, serves to selectively lock the leg member 50 in a desired position. It will thus be seen that by adjusting the leg member 50 relative to the nut 56 and securing the nut 58, the length of the leg member 50 projecting upwardly from the bottom wall 14 of the frame 12 may be adjusted. The upper end of the leg member 50 may be made to press against the underside of the bed 26, to selectively deform, or bias, the spring 46 and adjust the height of the bed 26 relative to the bottom wall against the bias of the spring 46.

Figure 6:
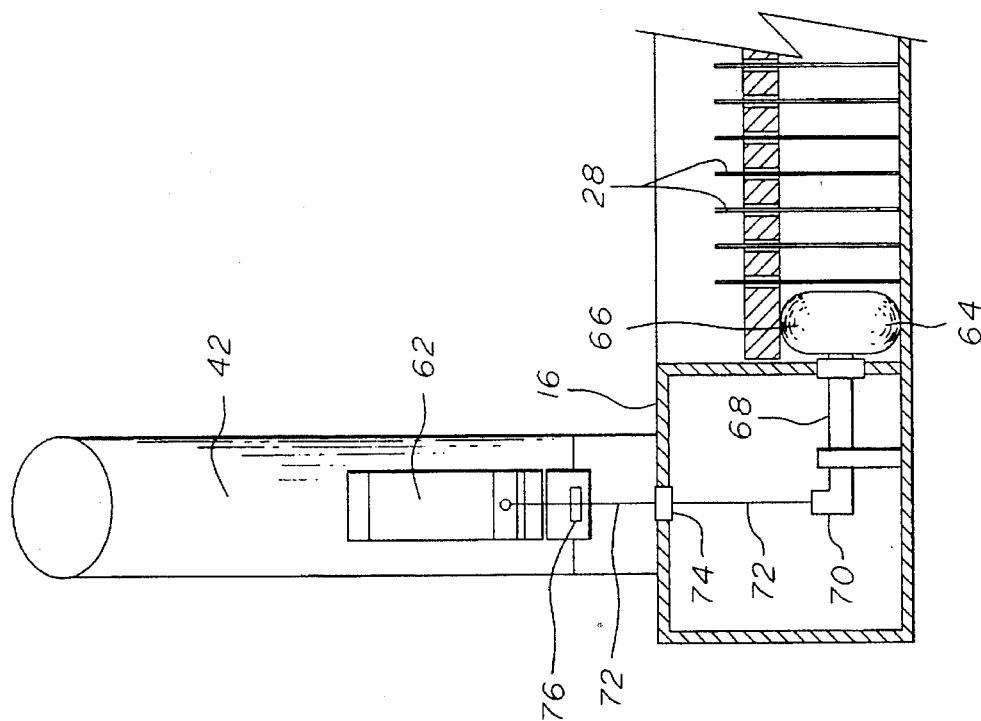
FIG. 6 is a partial detail view, in end elevation, showing the handle and activator mechanism of FIG. 5.
Figure 5:
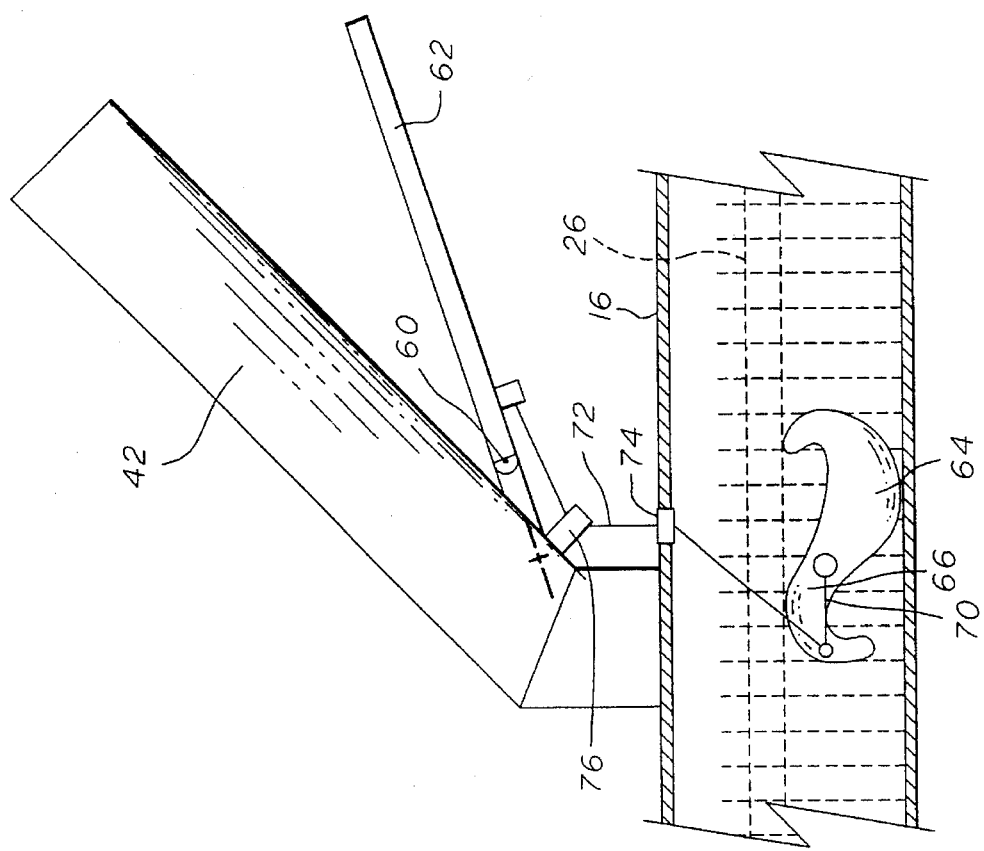
FIG. 5 is a partial detail view, in side elevation, showing a handle and an actuator mechanism for the floating bed in accordance with the invention.

Referring now to FIGS. 5 and 6, there are seen details of a mechanism by which the bed 26 may be actuated vertically, to eject mushroom stumps from the support pins. Referring to FIG. 5, pivotably connected to the handle 42, by a pivot 60, is a release handle 62. Pivotably supported within the side rail 16 of the frame 12 is an "S"-cam 64, a lobe 66 of which is adapted to engage the underside of the bed 26. The cam 64 is depicted in its disengaged (non-actuated) position in FIGS. 5 and 6.

Associated with the cam 64 is a cross-shaft 68, to which there is affixed a bellcrank arm 70. Affixed to one end of the bellcrank arm 70 and to the release handle 62, through suitable guides 74 and 76, is an actuator cable 72. Referring to FIGS. 5 and 6, it should now be apparent that if the handle 42 and release handle 62 are simultaneously grasped by an operator, and the release handle 62 is moved upwardly (counterclockwise) in FIG. 5, the S-cam 64 is made to rotate in a clockwise direction in the Figure so that the lobe 66 impinges upon the bottom surface of the bed 26, causing the bed to be elevated.

Referring now to FIGS. 1, 2 and 7a–7c, the operation of the apparatus 10 to sever mushroom caps from stumps and to practice the method should now be apparent.

Figure 7A:
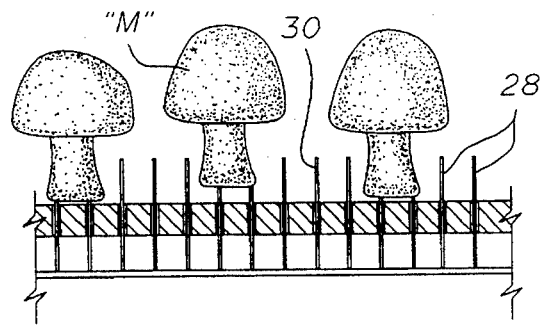
FIGS. 7a through 7c are partial cross-sectional views, in side elevation, illustrating the sequence of operation of the apparatus in FIG. 1.

Referring now to FIG. 7a, the orientation of the "raw" mushrooms, as picked, is seen. The picker places the mushrooms "M" on the pins 28 in an upright orientation, so that the caps and useful parts of the stems associated with the caps (all referred to inclusively as "caps") extend upwardly above the distal ends 30 of the pins 28.

Figure 7B:
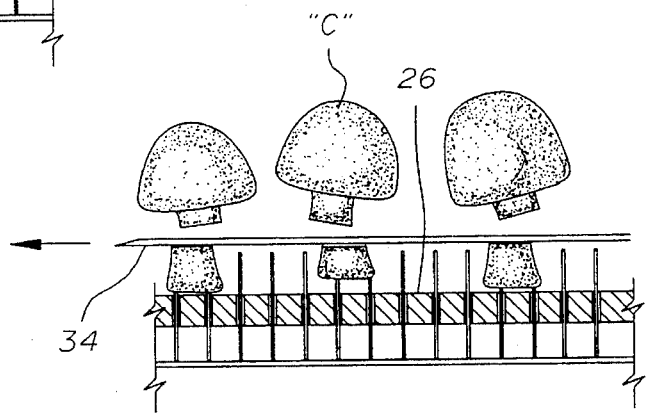

Referring to FIG. 7b, relative movement of the cutter 34 with respect to the supported mushrooms causes the caps "C" to be severed from the stumps "S". The cutter 34, it will be seen, passes over the distal ends 30 of the pins 28, and cuts in a plane just above those distal ends 30, leaving the stumps "S" on and between the pins 28.

Figure 7C:
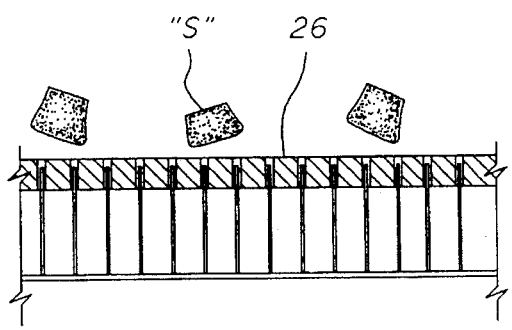

FIG. 7c depicts the moment of ejection of the stumps "S" by elevation of the bed 26, upon actuation of the release handle 62 as described above.

Upon completion of the above-mentioned cutting operation, but before elevation of the bed 26, the operator can manually remove the caps "C" from the frame 12 and place them in an appropriate collection, storage, or shipping container. The operator can also tilt the entire mechanism and direct the mushroom caps into the appropriate container while the cutter 34 is passing over the distal ends 30 of the pins 28. If the mushrooms with the stumps attached are placed on the pins 28 according to size (e.g. small on left, large on right), it is easy to direct the sized cut mushroom caps into their proper containers. Thus, the handling of each individual mushroom, conventionally associated with size grading, and which often leads to damage to the product by "bruising," can be eliminated.

The above-described handles 42 and 44 may be used by the operator to lift the apparatus, while actuating the S-cam 64 by means of the release handle 62, and dispose of the stumps "S" and other incidental debris within the frame 12 in an appropriate receptacle. The handle 44 may also serve as the actuator for the cutter 34. The handle 44 may be provided with a safety 78, which must be actuated to facilitate actuation of the cutter 34. It will be understood that, alternatively, other suitable means may be used to actuate the cutter 34. Thus, it is within the purview of the invention to provide an actuator for the cutter 34 independent of the handle 44.

Referring again to FIGS. 1 and 2, the opening 24 in the top of the frame 12 may be provided with a suitable shroud 80, to facilitate pouring of the stumps "S" and other material from the frame 12.

Figure 8:
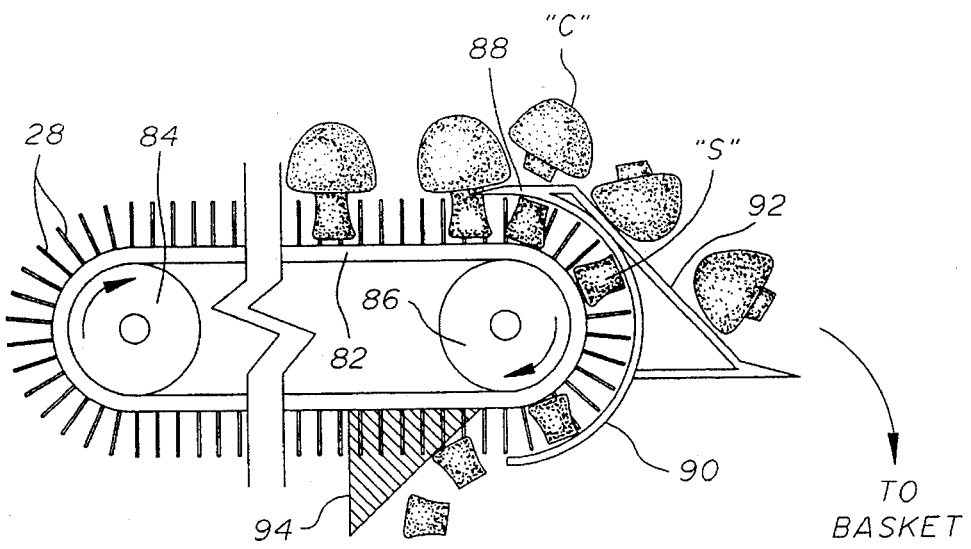
FIG. 8 is a diagrammatic view of another apparatus by which the method in accordance with the invention may be practiced in an a automated manner.

Referring now to FIG. 8, there is seen an alternative, semi-automatic apparatus for performing the method of the present invention. As seen in FIG. 8 is an endless belt 82 is supported between a pair pullies 84 and 86. The pullies may be driven, as by a pneumatic motor, not shown.

Disposed on the belt 82 are upstanding support pins 28', on which mushrooms may be placed At one extremity of the endless belt 82 is a cutter 88, associated with a stump shroud 90. Thus, it may been seen that movement of the endless belt 82 in such a manner that its upper flight moves to the right (as indicated in the arrow) causes relative movement between the cutter 88 and the supported mushrooms "M" and thus severance of the caps "C" from stumps "S" as the mushrooms pass the cutter 88. The stump shroud 90, which is semi-circular in configuration, keeps the stumps from mixing with the "good" product, which is made to pass over a cushioned plate 92 to a collection bin or basket, not shown. Fingers 94 associated with the lower flight of the endless belt 82 cause the stumps to separate from the pins 28' and releases them to a receptacle, not shown.

The present invention may be embodied in other specific forms without departing from its spirit or essential attributes. Accordingly, reference should be made to the appended claims, rather than the foregoing specification, as indicating the scope of the invention.

I claim:

1. A mushroom harvester comprising a frame having an open top, a bottom wall and respective side walls; a plurality of product holding pins extending generally vertically upwardly from said bottom wall and having distal ends spaced therefrom, said pins being so spaced from one another as to be adapted to receive the stems of mushrooms to be harvested; a vertically movable bed within said frame and disposed generally parallel to said bottom wall, said bed having respective clearance openings therein adapted to receive said pins; a cutter mounted on said frame for movement relative to said frame in a plane generally parallel to said bed and above said distal ends of said pins, whereby said cutter is adapted to separate caps of harvested mushrooms from the stumps of their stems; and an actuator coupled to said bed for selectively moving said bed vertically with respect to said pins, operation of said actuator elevating said bed to eject the stumps from said pins.

2. A mushroom harvester in accordance with claim 1, and a lifting handle coupled to each of said side walls of said frame, said lifting handles facilitating lifting and positioning of said harvester.

3. A mushroom harvester in accordance with claim 2, wherein one of said handles is coupled to said cutter as an actuator for said cutter.

4. A mushroom harvester in accordance with claim 2, and said release handle being operatively associated with one of said lifting handles.

5. A mushroom harvester in accordance with claim 1, wherein said actuator comprises a cam member operatively coupled to said frame and engaging said movable bed, and a release handle operatively coupled to said cam member for selectively actuating said cam member.

6. A mushroom harvester in accordance with claim 1, and means coupled to said frame and said bed for selectively adjusting the height of said bed relative to the ends of said pins.

7. A mushroom harvester in accordance with claim 4, wherein said means for adjusting the height of said bed comprises a plurality of spaced threaded members, and members having ends thereof abutting the underside of said bed, and nuts associated with said threaded members and said bottom wall to selectively secure said threaded members to said bottom wall.

8. A mushroom harvester in accordance with claim 7, and a foot portion coupled to each of said threaded members.

9. A mushroom harvester in accordance with claim 8, and springs coupled to said bed, said springs biasing said bed toward said bottom wall of said frame.

10. A method of harvesting and preparing mushrooms comprising the steps of picking mushrooms from a bed; providing a plurality of upright support pins for supporting the picked mushrooms in an orientation for separation of caps from stumps, the caps extending above the ends of the support pins; providing a cutter for separating caps from stumps; placing the picked mushrooms on the support pins; and separating the caps from the stumps by relative movement of the supported mushrooms and the cutter.

11. A method in accordance with claim 10, wherein said step of separating is performed by providing a cutter movable in a plane spaced from and parallel to the distal ends of the support pins, and moving the cutter to separate the caps.

12. A method in accordance with claim 10, wherein said step of separating is performed by moving said support pins and mushrooms past a fixed cutter.

13. A method in accordance with claim 10, wherein said step of placing picked mushrooms on the support pins includes the further steps of sorting and grouping the picked mushrooms according to size.

* * * * *